United States Patent
Yamaguchi et al.

(10) Patent No.: US 7,447,429 B2
(45) Date of Patent: Nov. 4, 2008

(54) BIDIRECTIONAL LINE SWITCHED RING NETWORK

(75) Inventors: Naoki Yamaguchi, Kawasaki (JP); Hideaki Tazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 445 days.

(21) Appl. No.: 10/773,368

(22) Filed: Feb. 5, 2004

(65) Prior Publication Data
US 2004/0179836 A1 Sep. 16, 2004

(30) Foreign Application Priority Data
Mar. 14, 2003 (JP) .............................. 2003-070309

(51) Int. Cl.
*H04L 12/437* (2006.01)

(52) U.S. Cl. .............................. 398/4; 398/59; 370/223; 370/224; 370/376; 370/907

(58) Field of Classification Search .............. 340/825; 398/59, 398, 54, 4
See application file for complete search history.

(56) References Cited

U.S. PATENT DOCUMENTS

| | | | | |
|---|---|---|---|---|
| 5,422,620 A | * | 6/1995 | Bitterli | 336/211 |
| 5,455,832 A | * | 10/1995 | Bowmaster | 714/712 |
| 5,537,393 A | * | 7/1996 | Shioda et al. | 370/223 |
| 6,452,931 B1 | * | 9/2002 | Norman, Jr. | 370/405 |
| 2001/0046207 A1 | * | 11/2001 | Isonuma et al. | 370/223 |
| 2002/0186719 A1 | * | 12/2002 | Subrahmanyan et al. | 370/506 |

FOREIGN PATENT DOCUMENTS

| | | |
|---|---|---|
| JP | 7-177115 | 7/1995 |
| JP | 7-264228 | 10/1995 |
| JP | 8-023321 | 1/1996 |
| JP | 8-316978 | 11/1996 |
| JP | 9-018506 | 1/1997 |
| JP | 10-290249 | 10/1998 |
| JP | 11-313096 | 11/1999 |
| JP | 2000-134246 | 5/2000 |
| JP | 2001-186159 | 7/2001 |
| JP | 2001-339416 | 12/2001 |
| JP | 2002-217927 | 8/2002 |

* cited by examiner

*Primary Examiner*—Jason Chan
*Assistant Examiner*—Danny W Leung
(74) *Attorney, Agent, or Firm*—Katten Muchin Rosenman LLP

(57) ABSTRACT

A bidirectional line switched ring network which enables high-speed operation with improved reliability because of a reduced software processing load is disclosed, and the network includes a plurality of optical transmission equipment sets connected in a ring form, wherein optical transmission equipment provided in a node on the transmission side performs transmission to each lower-order channel by attaching a transmission-side node ID, and, optical transmission equipment provided in a node on the reception side collates the received transmission-side node ID with an expected value of the transmission-side node ID having been set in advance, and when the collation does not match, the optical transmission equipment in the node on the reception side prevents a misconnection in the event of a failure by inserting an alarm indication signal.

4 Claims, 13 Drawing Sheets

|  | EAST | | | | WEST | | | |
| --- | --- | --- | --- | --- | --- | --- | --- | --- |
|  | RCV | | TRMT | | TRMT | | RCV | |
| E ⇒ W | S1 | D1 | S2 | D2 | S3 | D3 | S4 | D4 |
| W ⇒ E | D1 | S1 | D2 | S2 | D3 | S3 | D4 | S4 |

Sx : Source Node ID / Dx : Destination Node ID (4 bits each)

|  | EAST | | | | WEST | | | |
| --- | --- | --- | --- | --- | --- | --- | --- | --- |
|  | RCV | | TRMT | | TRMT | | RCV | |
| E ⇒ W | 1 | 2 | 2 | 1 | 2 | 3 | 3 | 2 |
| W ⇒ E | 2 | 1 | 1 | 2 | 3 | 2 | 2 | 3 |

※SID : Source Node ID

※SID expected value = 4 for both CH1, CH2

SID=4  SID=4
※SID = 4 for both CH1, CH2

Occurence of failure

※SID expected value = 4 for both CH1, CH2
Misconnection

Although a misconnection has occurred, no squelch is produced because of the SID matched with the SID expected value.

※Because of failure, it is unable to reach the TSI node.

SID=4  SID=4
※SID expected value = 4 for both CH1, CH2

FIG. 12A

Frame 1

| Flag bit | | E/W | Source Node ID | | | | |
|---|---|---|---|---|---|---|---|
| 1 | 1 | | | | | | |
| 1 | 2 | 3 | 4 | 5 | 6 | 7 | 8 |

FIG. 12B

Frame 2

| Flag bit | | Channel ID (Upper) | | | | | |
|---|---|---|---|---|---|---|---|
| 1 | 0 | | | | | | |
| 1 | 2 | 3 | 4 | 5 | 6 | 7 | 8 |

FIG. 12C

Frame 3

| Flag bit | | Channel ID (Lower) | | | | | |
|---|---|---|---|---|---|---|---|
| 0 | 1 | | | | | | |
| 1 | 2 | 3 | 4 | 5 | 6 | 7 | 8 |

BIDIRECTIONAL LINE SWITCHED RING NETWORK

FIELD OF THE INVENTION

The present invention relates to a bidirectional line switched ring (BLSR) network constituted of a plurality of optical transmission equipment sets connected in a ring form, and more particularly a system in a synchronous optical network (SONET) with a mixed configuration of VT-and STS-level paths.

BACKGROUND OF THE INVENTION

In digital optical communication, with increasing transmission capacity in recent years, path relief is required in the event of a failure such as a transmission line break, as well as improved line use efficiency. The bidirectional line switched ring (BLSR) is employed as a means to meet the above requirement. At present, the BLSR is supported in the higher-order paths of an STS (synchronous transport signal) level (>51.8 Mbps) mainly for use in the backbone network. For the purpose of implementation in a subscriber system, it is necessary to provide the BLSR supporting the lower-order VT (virtual tributary) paths (>1.5 Mbps) in future.

In the conventional STS-level BLSR network, in order to avoid misconnection at the time of the path relief, a path alarm signal (AIS: alarm indication signal) is inserted on a misconnected path. This is referred to as squelch operation.

To conduct the squelch operation, a squelch table is introduced in the conventional BLSR network. The squelch table, as shown in FIG. 1, is conveyed in an overhead byte to transfer to each node in the network. With this information, each node can identify a source node and a destination node of each path (hereafter referred to as channel Ch).

In FIG. 1, S denotes the source node ID, while D denotes the destination node ID. Further, ① E(east) ⇒W(west) and ② W(west) ⇒E(east) denote transfer directions of the squelch table.

In order to prevent the squelch table from failing to structure when a failure occurs in one direction, it is necessary to transfer the identical squelch table in both directions. The squelch table transferred in the direction ① is used when no failure occurs or when a failure occurs in the direction ②, while the squelch table transferred in the direction ② is used when the failure occurs in the direction ①.

Now, hereafter describes an example of structuring the squelch table under an exemplary channel setting condition shown in FIG. 2. The BLSR network shown in FIG. 2 is structured of three nodes having node IDs 1, 2 and 3, respectively, connected by transmission lines in the above-mentioned directions ① and ②.

In the node having node ID=2, a signal on a channel (Ch) 1 being input from the E (east) side is added at the node having node ID=1, and dropped at the node having node ID=2. In this case, the source node ID becomes '1', and the destination node ID becomes '2'.

Further, in the squelch table shown in FIG. 1, '1' is set into S1, and '2' is set into D1. Because the signal output from the E side is added at the node having node ID=2, and dropped at the node of interest, '2' is set into S2, and '1' is set into D2.

Similarly, because a signal output from the W side is added at the node having node ID=2, and dropped at the node having node ID=3, '2' is set into S3, and '3' is set into D3. Also, because a signal input from the W side is added at the node having node ID=3, and dropped at the node having node ID=2, '3' is set into S4, and '2' is set into D4. As a result, the squelch table for channel (Ch) 1 in the node having node ID=2 becomes as shown in FIG. 3.

As having been described above, in the conventional BLSR network, it becomes necessary to provide the table shown in FIG. 1 on a channel-by-channel basis.

When a failure such as a line break occurs in the network, each node judges whether each channel can reach the destination node based on the squelch table. If it is determined unable to reach, the node concerned squelches the channel concerned.

In this case, in order to squelch the VT-level channel, if this squelch is performed using an STS squelch table on an STS-level bases after bundling the VT-level channels to the STS, unnecessary service interruption to the network users may be produced.

The reason will be explained as follows, taking an example of the following case: The BLSR network structured of four nodes connected as shown in FIG. 4A. Assume that the communication between the nodes having node IDs 2 and 3 becomes disabled, caused by a failure. In addition, the communication between the nodes having node IDs 3 and 4 (hereafter, the nodes will simply be represented as nodes ID3, ID4, etc.) becomes disabled by a different failure.

In the normal condition shown in FIG. 4A, VT channels A and B are added at node ID4, mapped to a channel (Ch) 1 of an STS channel, and transmitted. The VT channel A is then dropped at node ID3. The VT channel B passes through node ID3, and is dropped at node ID2.

Further, a VT channel C is added at node ID3, and mapped into a channel (Ch) 1-2 of the STS channel, and thereafter dropped at node ID1 via node ID2.

In such a configuration of normal condition, when communication on both before and after node ID3 becomes disabled, the VT channels A, B are bridged from the STS channels (Ch) 1 to channels (Ch) 25 at node ID4, as shown in FIG. 4B (①).

Also, in node ID2, channels (Ch) 25 are switched to channels (Ch) 1 (②). With this, the VT channel A is dropped at node ID1, which produces a misconnection. Because the misconnection on the VT channel A is detected, the STS channel (Ch 1) is squelched.

At this time, in node ID1, an AIS (alarm indication signal) is inserted against the misconnection on the VT channel A. However, although line relief must be performed intrinsically for the VT channel B, the relief processing is not performed on the channel B. Instead, the AIS insertion processing is performed in node ID2 (④), caused by the squelch processing (③) for the STS channel 1 (Ch 1).

Namely, the VT channel B, on which the failure is to be evaded, is squelched. As a result, unnecessary service interruption is produced against the network user.

Because of this, it is required to provide identical settings of a source node and a destination node against the entire VT-level channels having been bundled into an identical STS channel. A relay node relaying a channel is not permitted to add or drop to/from a VT level channel.

To avoid this, there has been proposed a method of newly configuring a VT-level squelch table, in which channel processing for the VT level independent of the processing for the STS level is performed. (Refer to patent document Japanese Unexamined Patent Application No. 2001-186159)

However, supposing the higher-order transmission rate remains unchanged, it is necessary to prepare squelch table data (two bytes are required for each channel) of maximum 28 times as large as the size of the existing squelch table, for implementation, accommodation and processing, because 28 VT1.5 channels (VTs of 1.5 Mbps each) are included in one STS channel.

Further, 5,376 VT1.5 channels must be processed for the equipment supporting a 10-Gbps BLSR, or 21,504 VT1.5 channels must be processed for supporting a 40-Gbps BLSR.

Therefore, when implementing the aforementioned proposal, it is required to expand hardware memory capacity and software processing capacity, as well as a vast amount of man-hours for software development and evaluation. In addition, when performing the squelch processing by software, increased loads produced by the concentrated processing in one node may undesirably cause a problem on the overall network performance.

SUMMARY OF THE INVENTION

Accordingly, it is an object of the present invention to provide a bidirectional line switched ring (BLSR) network which can prevent a misconnection in the event of multiple failures without providing a squelch table, and enables the squelch processing even under an arbitrary VT-channel setting condition.

As a first aspect of the present invention to solve the aforementioned problem, a bidirectional line switched ring network includes a plurality of optical transmission equipment sets connected in a ring form. In the bidirectional line switched ring network, optical transmission equipment provided in a node on the transmission side performs transmission to each lower-order channel by attaching a transmission-side node ID. Also, optical transmission equipment provided in a node on the reception side collates the received transmission-side node ID with an expected value of the transmission-side node ID having been set in advance, and when the collation does not match, the optical transmission equipment in the node on the reception side prevents a misconnection in the event of a failure by inserting an alarm indication signal.

As a second aspect of the present invention to solve the aforementioned problem, in the first aspect of the bidirectional line switched ring network, the transmission-side node ID is transmitted using the V3 byte.

As a third aspect of the present invention to solve the aforementioned problem, in the second aspect, functions of inserting the transmission-side node ID into the V3 byte, collating with the expected value, and squelching can be set ineffective.

As a fourth aspect of the present invention, in the second aspect, using the V3 bytes for three frames, the transmission-side node ID and a channel ID are additionally transmitted to each VT channel, so that the time slot interchange (TSI) of the VT channel is enabled in a pass-through node.

As a fifth aspect of the present invention, in the fourth aspect, the time slot interchange (TSI) is enabled in the pass-through node, using the first to sixth bits of the H4 byte.

As a sixth aspect of the present invention, in the second aspect, the transmission-side node ID is transmitted using the V4 byte, in place of the V3 byte.

As a seventh aspect of the present invention, a bidirectional line switched ring network includes a plurality of optical transmission equipment sets connected in a ring form. Optical transmission equipment provided in a node on the transmission side performs transmission to each higher-order channel by attaching a transmission-side node ID. Also, optical transmission equipment provided in a node on the reception side collates the received transmission-side node ID with an expected value of the transmission-side node ID having been set in advance. When the collation does not match, the optical transmission equipment in the node on the reception side prevents a misconnection in the event of a failure by inserting an alarm indication signal.

As an eighth aspect of the present invention, in the seventh aspect, the transmission-side node ID is transmitted using the H3 byte.

As a ninth aspect of the present invention, in the eighth aspect, the transmission-side node ID and a channel ID are additionally transmitted to each STS channel using the H3 bytes for three frames, so that the time slot interchange (TSI) of the STS channel is enabled in a pass-through node.

Further scopes and features of the present invention will become more apparent by the following description of the embodiments with the accompanied drawings.

BRIEF DESCRIPTION OF THE DRAWINGS

FIGS. 12A-12C show diagrams illustrating transfer formats when a channel ID is added to a source node ID in the V3 byte for transmission, correspondingly to the embodiment shown in FIGS. 11A, 11B.

DETAILED DESCRIPTION OF THE PREFERRED EMBODIMENTS

The preferred embodiment of the present invention is described hereinafter referring to the charts and drawings. FIG. 5 shows an explanation diagram illustrating switchover operation in the event of a failure in a bidirectional line switched ring (BLSR) network according to the present invention. As in the example shown in FIGS. 4A, 4B, there is considered the BLSR network in which four nodes are connected, and a case of the network condition shifted from the normal condition shown in FIG. 5A to a communication disabled condition, caused by a line failure between node ID2 and node ID3 and a line failure between node ID3 and node ID4.

Figures 1, 2, 3:
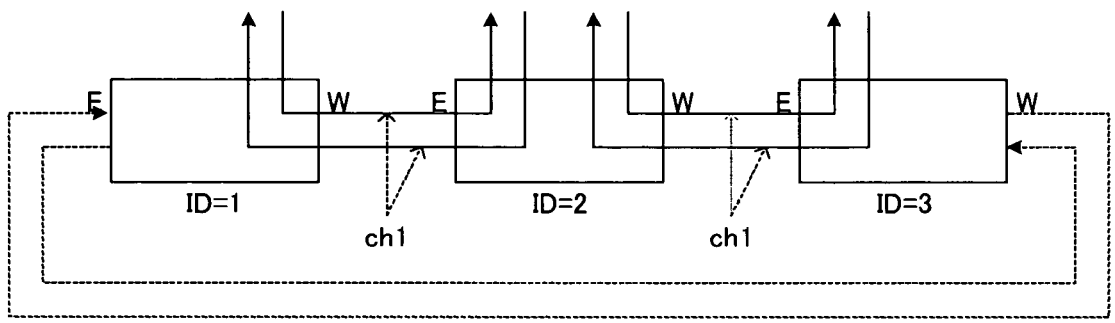
FIG. 1 shows a diagram illustrating an exemplary squelch table.
FIG. 2 shows a diagram illustrating an example of a squelch table structure under an exemplary channel setting condition.
FIG. 3 shows a diagram illustrating squelch table contents for channel (Ch) 1 in the node having a node ID=2.
Figure 4A:
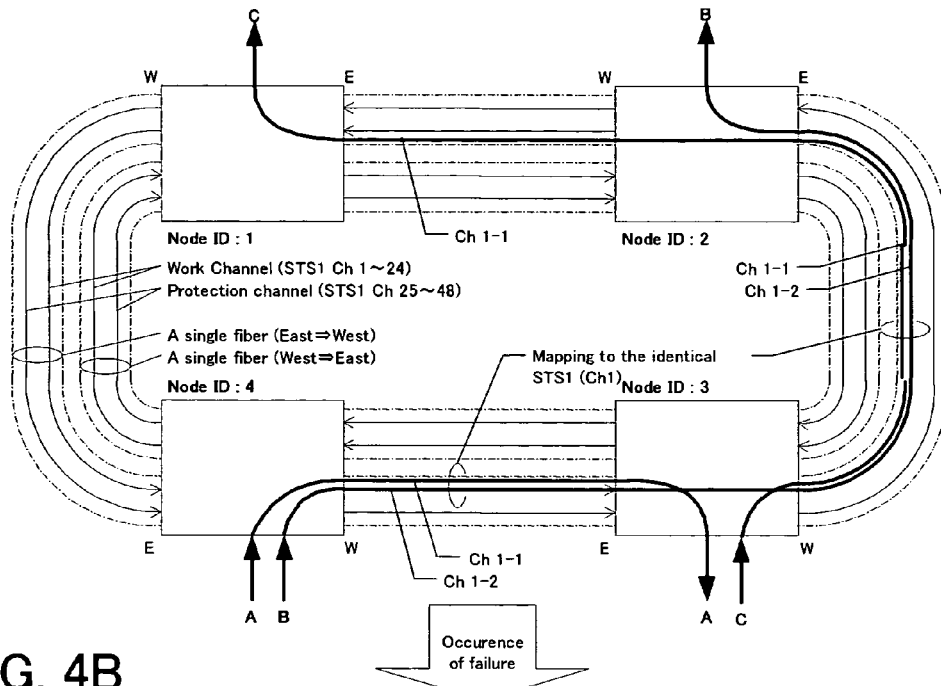
FIGS. 4A and 4B show diagrams illustrating an exemplary network configuration of a BLSR network.
Figure 4B:
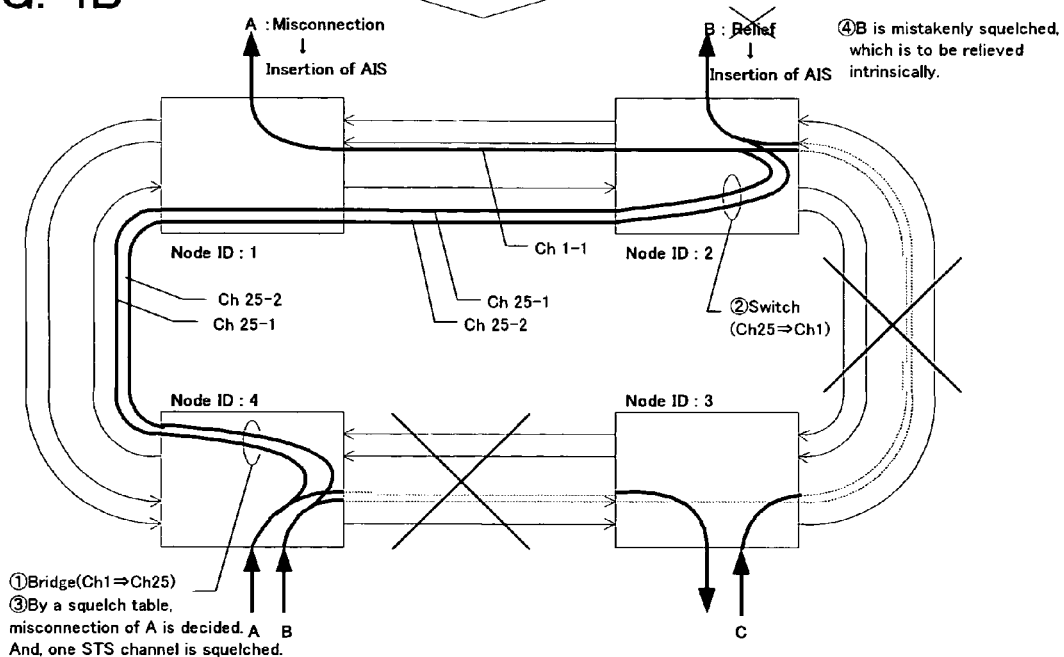
Figure 5A:
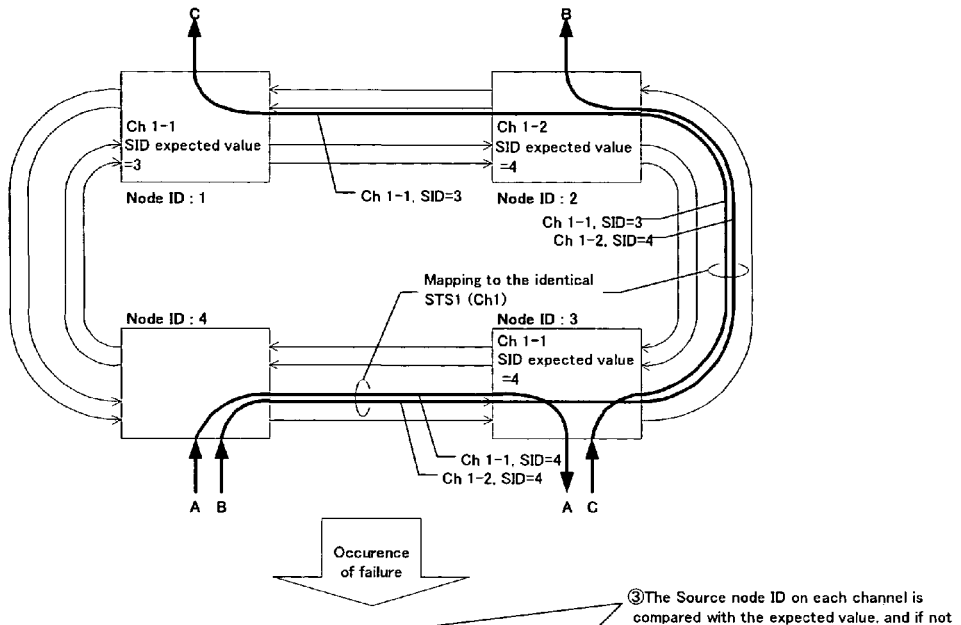
FIGS. 5A and 5B show explanation diagrams illustrating switchover operation in the event of a failure in a BLSR network according to the present invention.

In the normal condition shown in FIG. 5A, similar to the case shown in FIG. 4A, lower-order VT channels A, B are mapped into higher-order STS channel 1 (Ch 1). Here, a difference from the example shown in FIG. 4A lies in that a source node ID is additionally transmitted in accordance with the present invention.

Figure 5B:
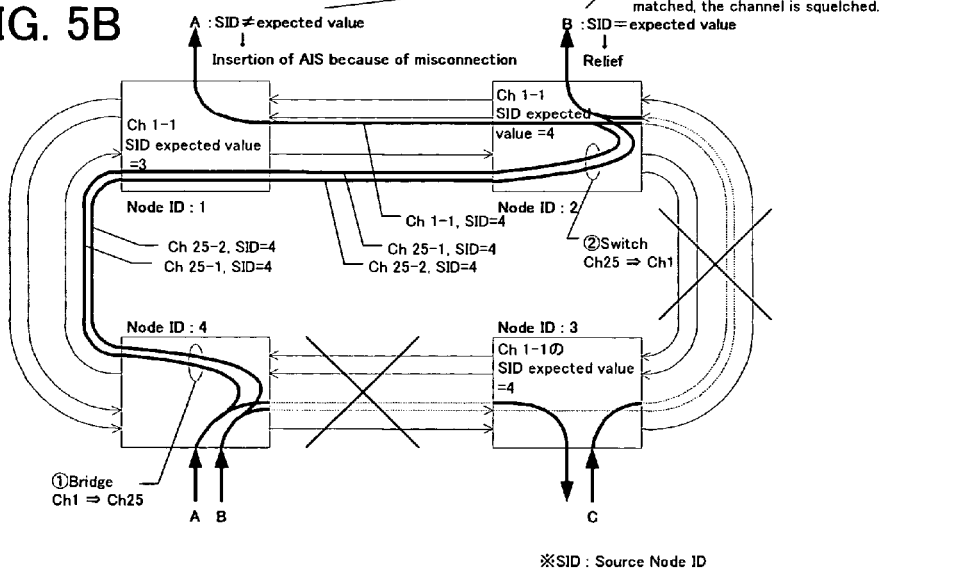

In this configuration of the normal condition, when communication is disabled at the points before and after node ID3, STS channel 1 (Ch 1) is bridged to a channel 25 (Ch 25) in node ID4 (①), as shown in FIG. 5B. Further, in node ID2, channel (Ch) 25 is switched over to channel (Ch) 1 (②)

In FIG. 5B, both in node ID1 and node ID2, the source node ID (SID) on each channel is compared to the expected value. When the collation does not match, the squelch is performed (③).

In the example shown in FIG. 5B, in node ID1, the SID (ID4) does not match with the expected value (ID3). Because of this mismatch, a misconnection is detected, and an AIS is inserted. On the other hand, the SID matches with the expected value (ID4) in node ID2. Therefore, the VT channel B is relieved at node ID2.

In such a way, according to the present invention, source ID (SID) information related to each VT channel is additionally transferred on the channel concerned. In the destination node, the received SID is compared with the expected value having been set in the node of interest at the time of the channel setup. When the comparison does not match, the channel concerned is squelched.

With this method, without using a squelch table, it becomes possible to prevent a misconnection in the event of multiple failures. Further, squelch processing can be performed even when a VT channel is arbitrarily set.

Figure 6A:
FIGS. 6A-6C show explanation diagrams illustrating insertion of a source node ID into each VT channel.
Figure 6B:
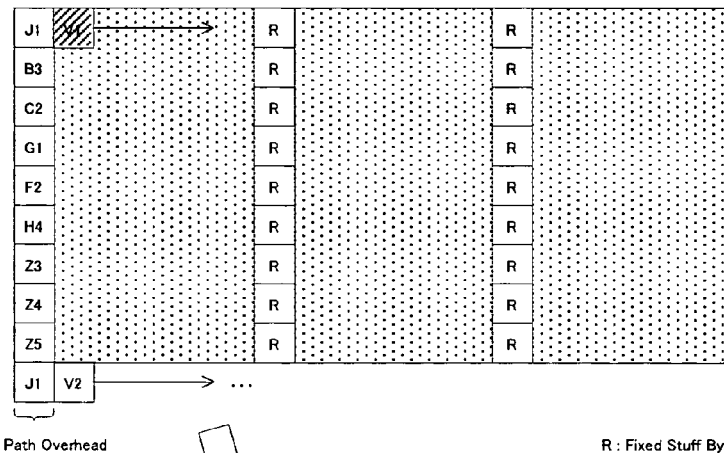
Figure 6C:
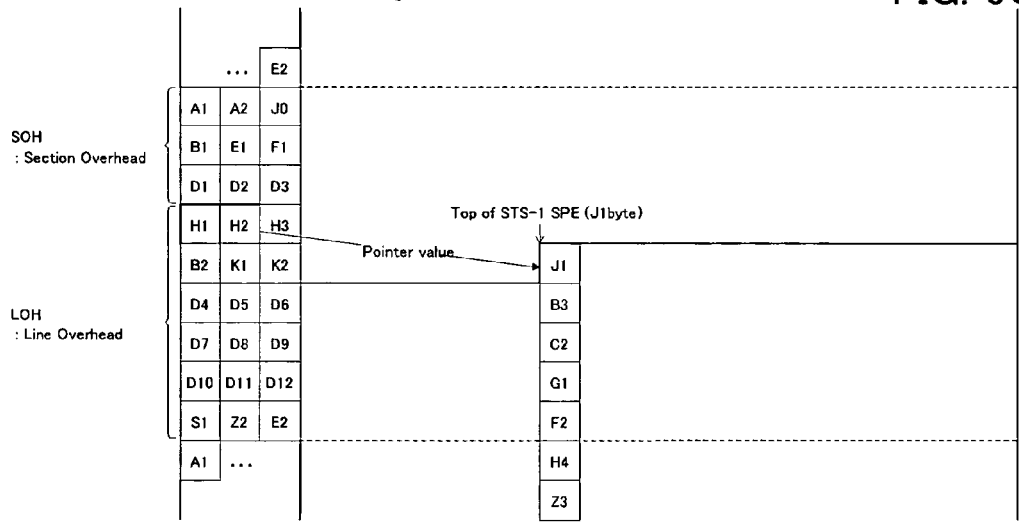

FIGS. 6A-6C show explanation diagrams illustrating insertion of a source node ID into each VT channel. This insertion is performed by use of the V3 byte of a VT superframe into which each VT-level channel is mapped.

In detail, FIG. 6A shows a SONET VT superframe. FIG. 6B shows the mapping of each frame in the VT superframe shown in FIG. 6A to an STS-1 synchronous payload envelope (SPE).

Further, FIG. 6C shows a diagram illustrating the mapping to the STS-1 frame of the STS-1 SPE. The STS-1 frame includes a section overhead (SOH) and a line overhead (LOH) The LOH includes H1 and H2 bytes which represent a pointer for specifying the top location of the STS-1 SPE in the STS-1 frame.

Here, the V3 byte in the VT superframe shown in FIG. 6A is prepared for the stuff or destuff to be performed according to the indication of the V1 and V2 bytes. In case of the positive stuff operation, a stuff byte is inserted immediately after the V3 byte.

Also, in case of the negative stuff operation, the stuff byte is inserted in the V3 byte. Accordingly, when there is neither stuff operation nor destuff operation, the V3 byte remains empty. Further, according to the Telcordia standard GR-253 Issue 3 (R3-115), it is specified that a stuff action shall be inhibited after three frames after the stuff action is performed.

Accordingly, source node ID information can be conveyed by use of these three frames even when the negative stuff operation occurred.

Therefore, in the present invention, whatever frequency deviation may occur between the nodes constituting the network, the V3 byte can be used for storing the source node ID.

Figure 7:
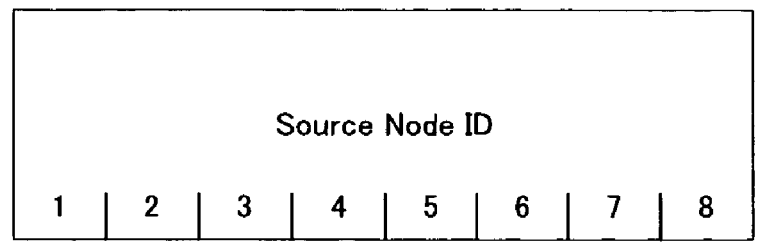
FIG. 7 shows a diagram illustrating data format definition of the V3 byte in other cases than the negative stuff.

The data format of the V3 byte in other cases than the negative stuff is defined as shown in FIG. 7. The entire eight bits are for use in storing the source node ID. Using this data format, it becomes possible to extend the number of nodes constituting one BLSR up to 256, while this number has been 16 in maximum in the conventional method.

Further, bits #1 to #6 of the H4 byte in the path overhead (POH) shown in FIG. 6B is for use as flag bits. (Bits #7, #8 are used for identifying V1-V4). With this method, it becomes possible to extend the number of nodes more.

Also, in place of the V3 byte, it is possible to add the identical function by using the V4 byte, of which use is not defined at present. When this V4 byte is used, the processing becomes simplified because it is unnecessary to take the stuff operation into consideration. However, as long as using the V3 byte, the function of the present invention can be applied even in case that a new function which uses the V4 byte is introduced in the future.

[Circuit Configuration and Operation]

Figure 8:
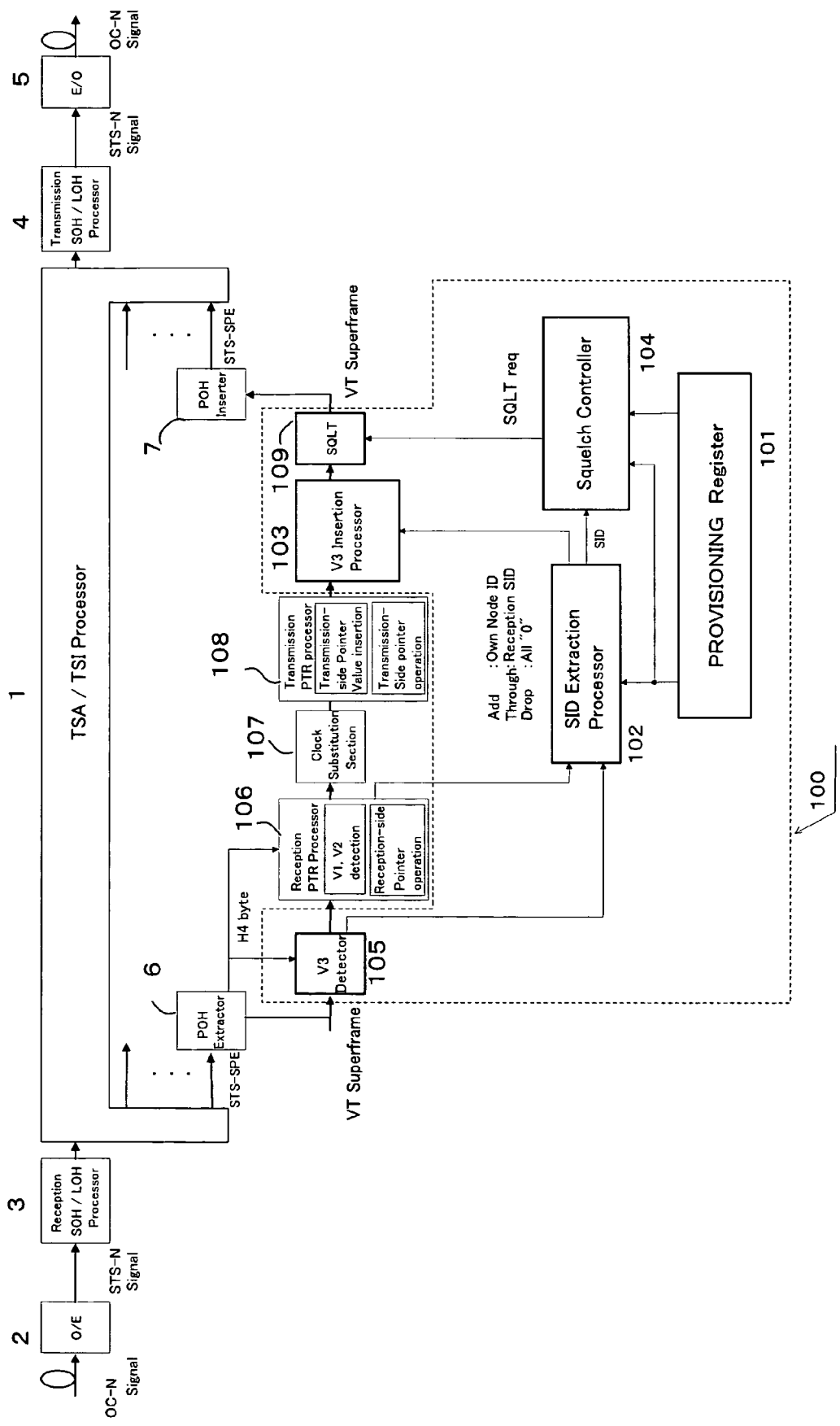
FIG. 8 shows an exemplary configuration block diagram of a node to which the present invention is applied.

FIG. 8 shows an exemplary configuration block diagram of a node of the bidirectional line switched ring (BLSR) network to which the present invention is applied. In FIG. 8, a TSA/TSI processor 1 is provided for other processing than for the existing VT format, which has no direct concern with the present invention. Therefore, further description of TSA/TSI processor 1 is omitted.

A V3 byte processor 100 is newly introduced for implementing the method in accordance with the present invention. Here, if N VT superframes shown in FIG. 6A are mapped into the STS, this is represented as STS-N. Accordingly, the aforementioned V3 byte processors 100 are provided as many as the number of VT superframes mapped into the STS. Namely, in the case of STS-N, N V3 byte processors 100 are provided. In FIG. 8, one V3 byte processor 100 is typically illustrated corresponding to the case of STS-1.

In the input side of TSA/TSI processor 1, an optical signal having been input from an optical transmission line is converted to an electric signal in an optical-electric converter 2. From the STS-1 frame converted to the electric signal shown in FIG. 6C, a section overhead (SOH) and a line overhead (LOH) are extracted and processed in an SOH/LOH processor 3.

Each of the N SPEs output from SOH/LOH processor 3, in which the VT superframe (FIG. 6A) is mapped, is input to the corresponding V3 byte processor 100.

Processing for one SPE will be described hereafter, referring to FIG. 8. As a prerequisite, when setting in each node a VT-level channel to a channel constituting the BLSR network, it is obligated to specify the source node ID of the channel concerned as additional information.

At this time, in the entire nodes in which the channels are set, add/pass-through/drop information is set into a register for setting the condition, which is referred to as a provisioning register 101, provided in V3 byte processor 100.

In the drop node, the source node ID is additionally set into provisioning register 101, as an expected value.

In FIG. 8, a path overhead (POH) extractor 6 extracts a path overhead (POH) from an STS-SPE frame signal (refer to FIG. 6B), and input a VT superframe (refer to FIG. 6A) into a V3 byte detector 105. Meanwhile, the H4 byte included in the path overhead (POH) having been detected by POH extractor 6 is input into both V3 byte detector 105 and a reception pointer processor 106.

The H4 byte indicates the mapping locations of the V1, V2 and V3 bytes. Therefore, based on the H4 byte, V3 byte detector 105 can detect the V3 byte, and reception pointer processor 106 can detect the V1 and V2 bytes.

Reception pointer processor 106 further acquires a pointer value shown in FIG. 6C, substitutes the intra-equipment clock for the transmission line clock in a clock substitution section 107, and then performs transmission to a transmission pointer processor 108. In this transmission pointer processor 108, the transmitted pointer value is converted into a pointer value corresponding to the location in the transmission frame, and also, a new pointer is inserted.

Meanwhile, in V3 byte detector 105, the V3 byte is detected according to the H4 byte, and the detected V3 byte is input into an SID extraction processor 102.

The processing in SID extraction processor 102 differs depending on node functions. Namely, in the node being set to 'add', SID extraction processor 102 does not extract the source node ID from the V3 byte. Instead, SID extraction processor 102 feeds the node ID of the own node (which becomes a source node ID) to a V3 insertion processor 103. Accordingly, in V3 insertion processor 103, the own node ID is inserted into the V3 byte. At this time, no process is performed in a squelch controller 104, and squelch processing is inhibited in a squelch processor 109.

In the node being set to 'pass through', SID extraction processor 102 extracts the source node ID from the received V3 byte. Here, when a decrement was performed in a reception pointer processor 106, SID extraction processor 102 retains the source node ID having been received at the previous time, for use as the received source node ID.

Further, SID extraction processor 102 feeds the extracted source node ID to V3 insertion processor 103. V3 insertion processor 103 then inserts the received source node ID into the V3 byte. Here, when the decrement was performed in a transmission pointer processor 108, this insertion of the received source node ID is inhibited, because data has been stored during the negative stuff operation. In this case, no squelch operation is performed in squelch controller 104, and the squelch processing is inhibited in squelch processor 109.

In the node being set to 'drop', SID extraction processor 102 extracts the source node ID from the received V3 byte. Here, when the decrement was performed in a reception pointer processor 106, SID extraction processor 102 retains the source node ID having been received at the previous time.

SID extraction processor 102 feeds all zeros to V3 insertion processor 103. Also, SID extraction processor 102 feeds the extracted source node ID to squelch controller 104. Accordingly, V3 insertion processor 103 inserts all zeros into the V3 byte. Here, when the decrement was performed in transmission pointer processor 108, this insertion of the received source node ID is inhibited, because data has been stored during the negative stuff operation.

In squelch controller 104, the source node ID having been received is collated with the expected value for the channel having been retained in the provisioning register 101. When the collation does not match, the channel concerned is squelched.

By making the aforementioned processing function added in V3 byte processor 103 ineffective, it is possible to apply the circuit to the conventional BLSR network without any influence.

Figure 9:
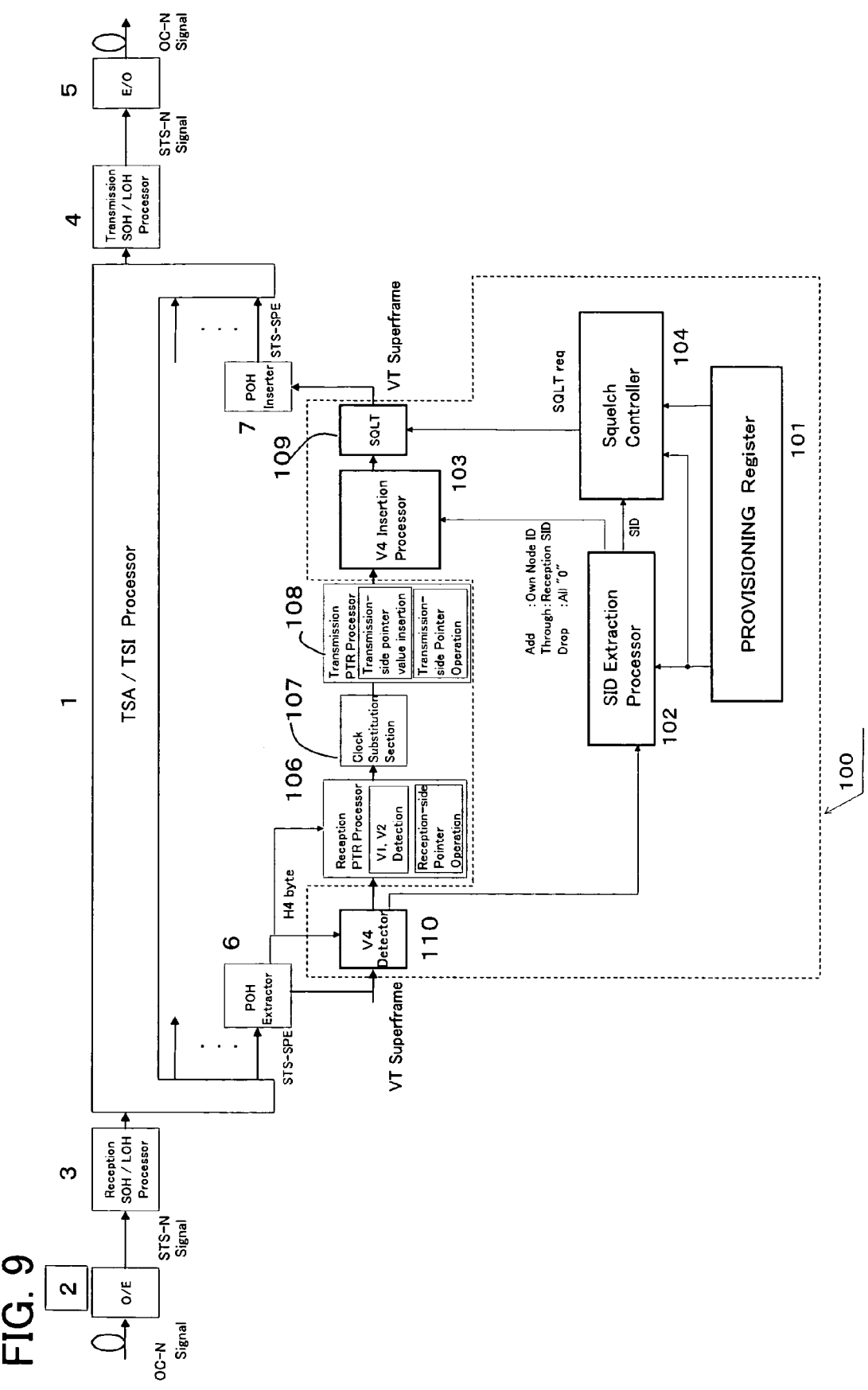
FIG. 9 shows a diagram illustrating a circuit configuration in case the V4 byte is used.

The circuit configuration when using the V4 byte is shown in FIG. 9. The operation of this circuit is almost the same as in the configuration using the V3 byte shown in FIG. 8. The difference lies in that a V4 byte detector 110 is provided in place of V3 byte detector 105. V4 byte detector 110 extracts the V4 byte from the SPE mapping location identified by the H4 byte. In this embodiment, because there is no stuff operation for the V4 byte, it becomes possible to omit the processing related to the negative stuff operation.

In accordance with the present invention, as having been described, squelch decision and processing with simple procedures can be achieved by adding a simple structured hardware in each node, without using any squelch table.

Thus, it is possible to prevent misconnection because of the switch operation initiated by multiple failures, even when the VT channels are set arbitrarily in a BLSR network in which VT-level channels and STS-level channels are mixed.

Also, it becomes unnecessary to provide a large scale of memory required by the implementation of the squelch table for the VT-level channels. Further, conventionally, decision and processing for the squelch on the occurrence of a switchover are performed by software, which may produce malfunction caused by increased loads when processing is concentrated in one node. According to the method of the present invention, the processing can be performed by hardware, with reduced loads, fastened operation speed, and improved reliability.

Now, an embodiment of the present invention will be described below.

[Time Slot Interchange (TSI) Processing in a Pass-Through Node Constituting The BLSR Network]

Using V3 bytes for three frames, a channel ID in addition to a source node ID is transferred to each channel, thereby making it possible to perform the TSI operation for VT channels in a pass-through node, which was inhibited in the conventional BLSR network equipment. This enables improvement of channel use efficiency.

Figure 10A:
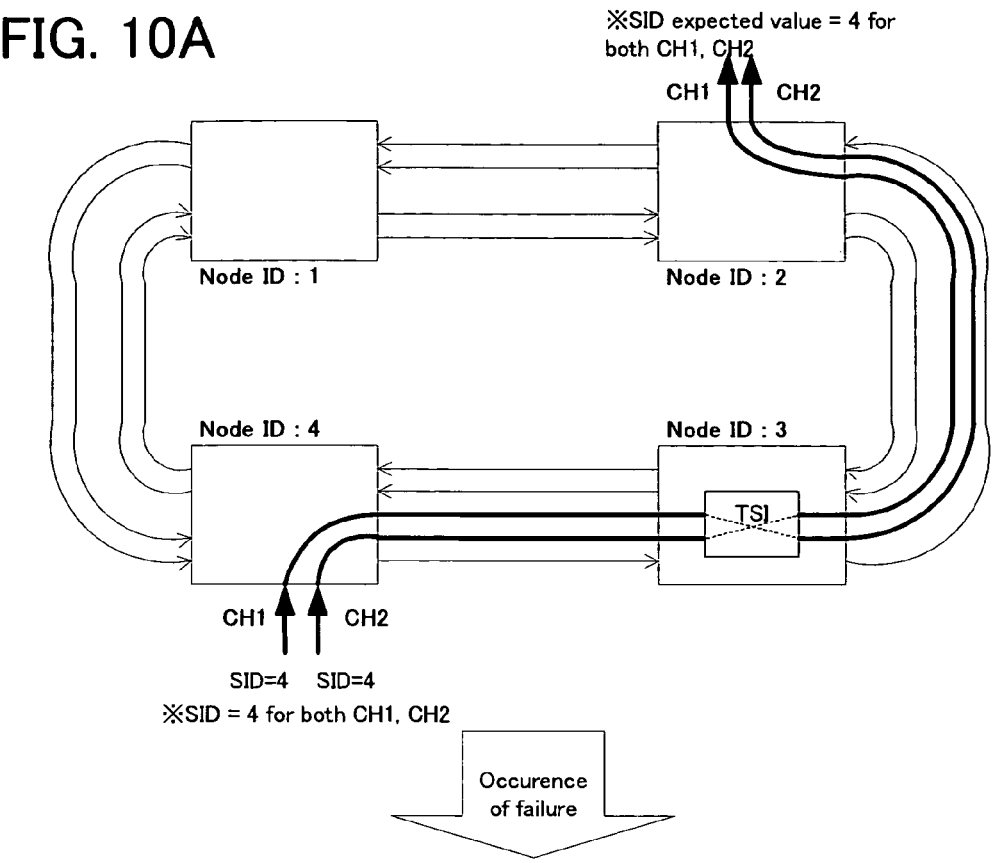
FIGS. 10A, 10B show diagrams illustrating an exemplary embodiment of the time slot interchange (TSI) performed in a pass-through node, when an add node transmits a source node ID only.
Figure 10B:
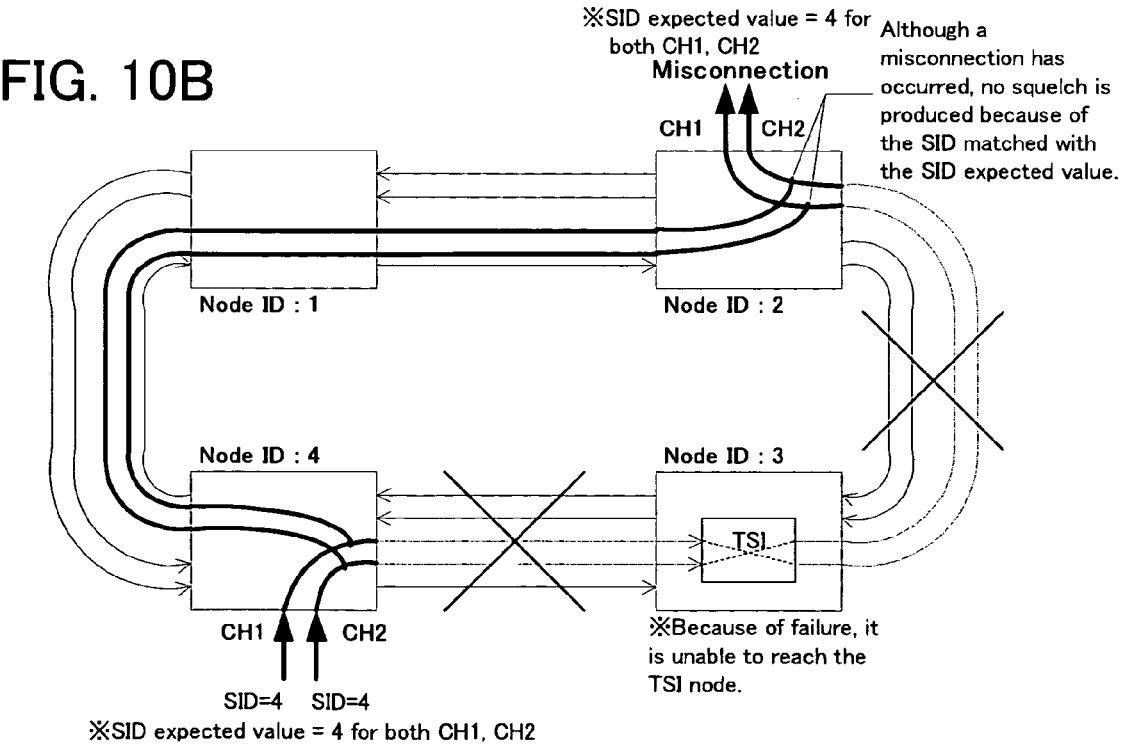

FIGS. 10A, 10B show an embodiment of the TSI operation in a pass-through node when an add node transmits the source node ID only. As shown in FIG. 10A, a channel CH1 added at node ID4 is time slot interchanged to a channel CH2 at node ID3, and dropped to channel CH2 at node ID2. Similarly, channel CH2 added at node ID4 is time slot interchanged to channel CH1 at node ID3, and then dropped to channel CH1 at node ID2.

At this time, in node ID2, both the expected values of source node IDs for channels CH1 and CH2 are '4'. In this network configuration, a case of failures occurring on both sides of node ID3 will be discussed hereafter.

In FIG. 10B, channels CH1 and CH2 added at node ID4 can reach node ID2, via node ID1, as a result of BLSR relief. However, because these channels are unable to pass through node ID3, the TSI is not performed. Therefore, channel CH1 is dropped to channel CH1 at node ID2, and also channel CH2 is dropped to channel CH2 at node ID2, which results in a misconnection.

However, as for the source node ID, the source node ID being actually received matches with the expected value. Accordingly, no squelch is performed, and it is unable to insert an AIS.

To avoid such a misconnection, the TSI operation is inhibited in the pass-through node, as far as only source node information is used for channel identification. This situation also occurs in the conventional BLSR network equipment having a squelch table.

Figure 11A:
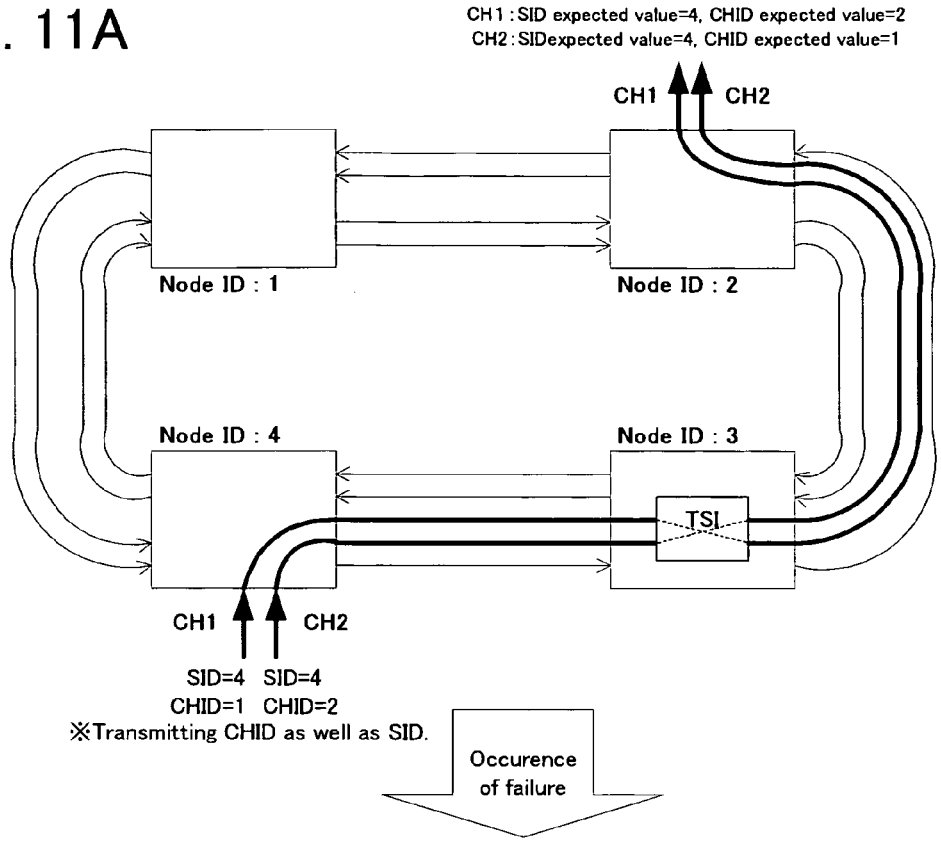
FIGS. 11A, 11B show diagrams illustrating an exemplary embodiment of the time slot interchange (TSI) on a VT channel performed in a pass-through node, when an add node transmits a channel ID as well as a source node ID.
Figure 11B:
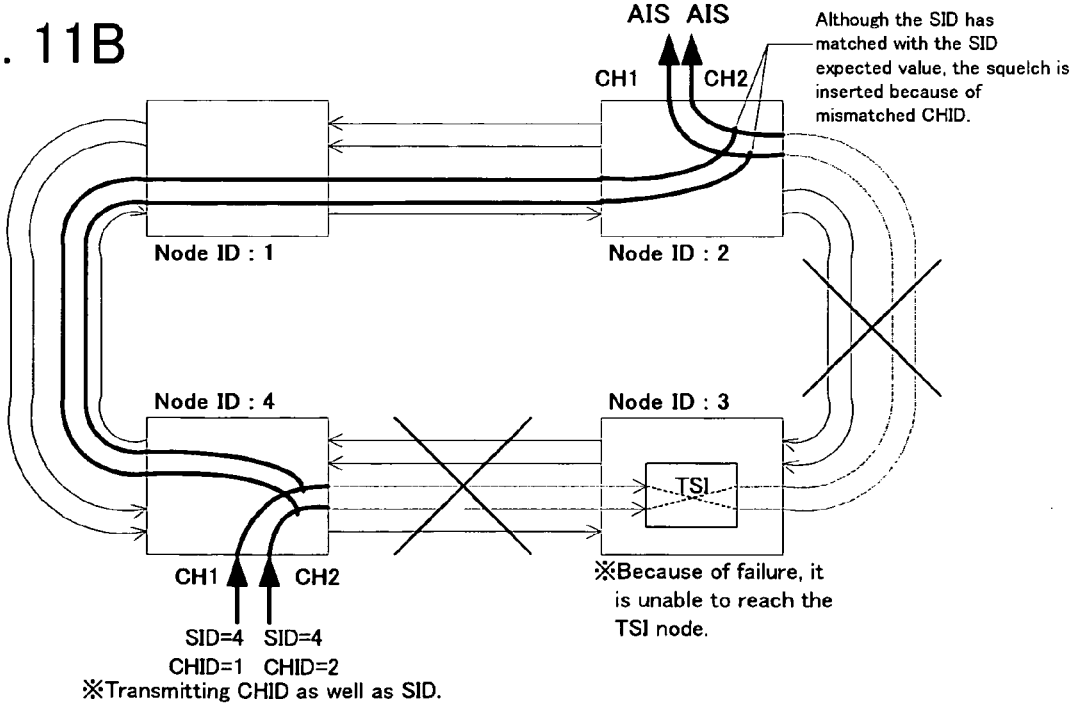

In contrast, according to an embodiment using a configuration shown in FIGS. 11A, 11B, a channel ID is transmitted from an add node, together with a source node ID. With this, the TSI operation for VT channels can be performed at a pass-through node.

In node ID4 (add node), the node ID of the own node ID4 is inserted into each V3 byte for channels CH1, CH2 as a source node ID, and also the channel number concerned is inserted as a channel ID. In node ID2 (drop node), the expected value of the source node ID and the expected value of the channel ID are set in advance for channels CH1, CH2.

With such a configuration, a case of failures similar to those shown in FIG. 10B is considered in the following. As for channels CH1, CH2 of node ID2, the expected value of the channel ID does not match with the received channel ID value, though the expected value of the source node ID matches with the received source node ID value. In this case, the squelch is performed, and as a result, a misconnection can be prevented.

In such a way, by adding the channel ID to the source node ID, it becomes possible to perform the TSI operation for VT channels in a pass-through node, which is inhibited in the conventional BLSR configuration.

FIGS. 12A through 12C show the formats for transferring a channel ID in addition to a source node ID through the V3 byte, correspondingly to the embodiment shown in FIGS. 11A, 11B.

In the V3 byte, flag bits (bits #1-#2) are provided for identifying ID types (bits #3-#8) to be transmitted.

The flag '11' (FIG. 12A) represents that the source node ID (bits #4-#8) of the node in which the channel is added, and the transfer direction (bit #3) are transferred. The bit #3 denotes the direction of transfer; either E or W.

The flag '10' (FIG. 12B) represents that an upper part of a channel ID is transferred, while the flag '01' represents a lower part of the channel ID is transferred.

Total 12 bits of the upper part and the lower part of the channel ID represents a channel number to which the channel is added, and thus totally 4,096 channels can be specified. By use of the V3 bytes for three frames, the above-mentioned formats are transferred repeatedly. As such, by identifying the ID type being transmitted using the flag bits, the channel ID can be transferred.

It is also possible to transfer the formats shown in FIGS. 12A through 12C by use of the V4 byte.

As having been explained, according to the present invention, by identifying each type of an ID to be transmitted through the V3 byte, and by transferring a source node ID and a channel ID additionally one each channel, it becomes possible for a drop channel to recognize the add node ID and the channel ID.

In such a way as having been described, it becomes possible to perform the TSI operation in a pass-through node, which has been inhibited in the conventional BLSR network equipment. As a result, it becomes possible to improve channel use efficiency.

Further, using bits #1-#6 in the H4 byte as flag bits, it is possible to expand the number of channel IDs. With this, it becomes possible to expand the number of channels in which the TSI operation for VT channels can be performed in a pass-through node of the BLSR network.

Figure 13:
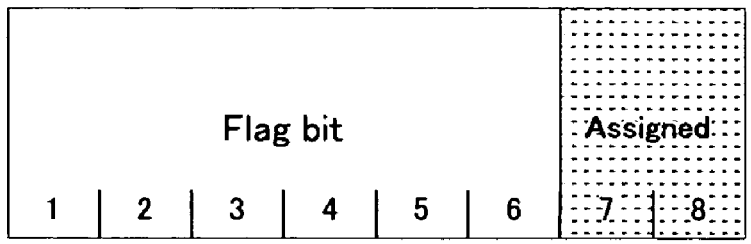
FIGS. 13A-13D show diagrams illustrating transfer formats when the H4 byte is used as flag bits.

In FIGS. 13A-13D, diagrams illustrating transfer formats when the H4 byte is used as flag bits are shown. As shown in FIG. 13A, bits #7, #8 in the H4 byte has already been assigned for indicating which byte among the V1 to the V4 is currently being transferred. However, bits #1-#6 remain unassigned at present.

Figure 13B:
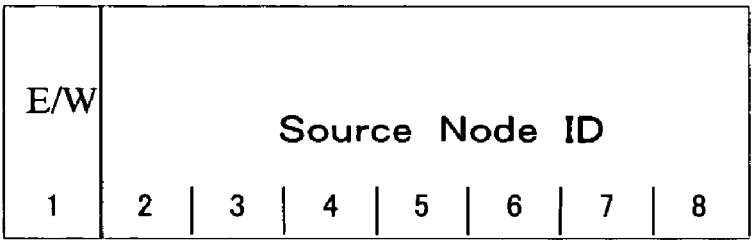
Figure 13C:
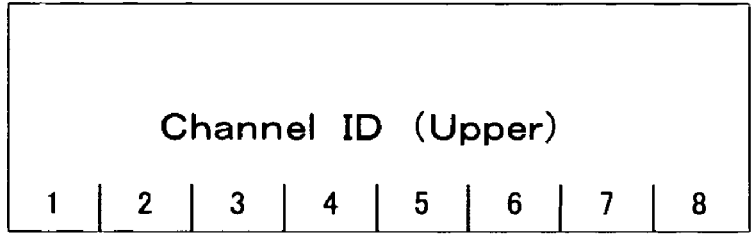
Figure 13D:
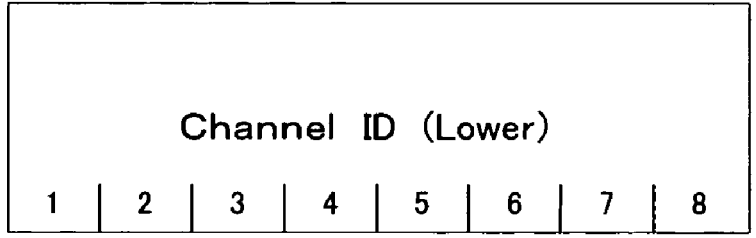

Therefore, by use of these bits #1-#6 in the H4 byte, an ID type transferred by the V3 byte can be specified. FIGS. 13B, 13C and 13D show the contents respectively corresponding to the V3 byte types indicated by the bits #1-#6 in the H4 byte.

FIG. 13B illustrates the contents of the V3 byte included in the first frame. Bit #1 is for use as a discriminator of the direction, E or W. Bits #2-#8 represent the node ID in which the channel is added. Further, FIGS. 13C, 13D represent the channel ID to which the channel is added.

As can be seen in FIGS. 13C and 13D, two bytes (16 bits) can be used to identify an add channel, and as a result, it is possible to deal with up to 65,536 VT channels (which corresponds to an equipment capacity of 120 Gbps or more)

Also, as shown in FIG. 13A, the flag bits can be expanded up to 6 bits. Therefore, it is possible to increase the number of format types to be transferred in the V3 byte. For example, the number of channel IDs and source node IDs for transfer can be increased still more.

In such a way, it is possible to incorporate the TSI function for VT channels in a pass-through node of the BLSR network configuration, even in equipment of a larger capacity which will be installed in future.

In the drop node, by enabling setting of two expected values of source node IDs, simultaneous setting of drop and continue becomes possible using the similar circuit configuration to that shown in the embodiment of FIG. 8.

Figure 14:
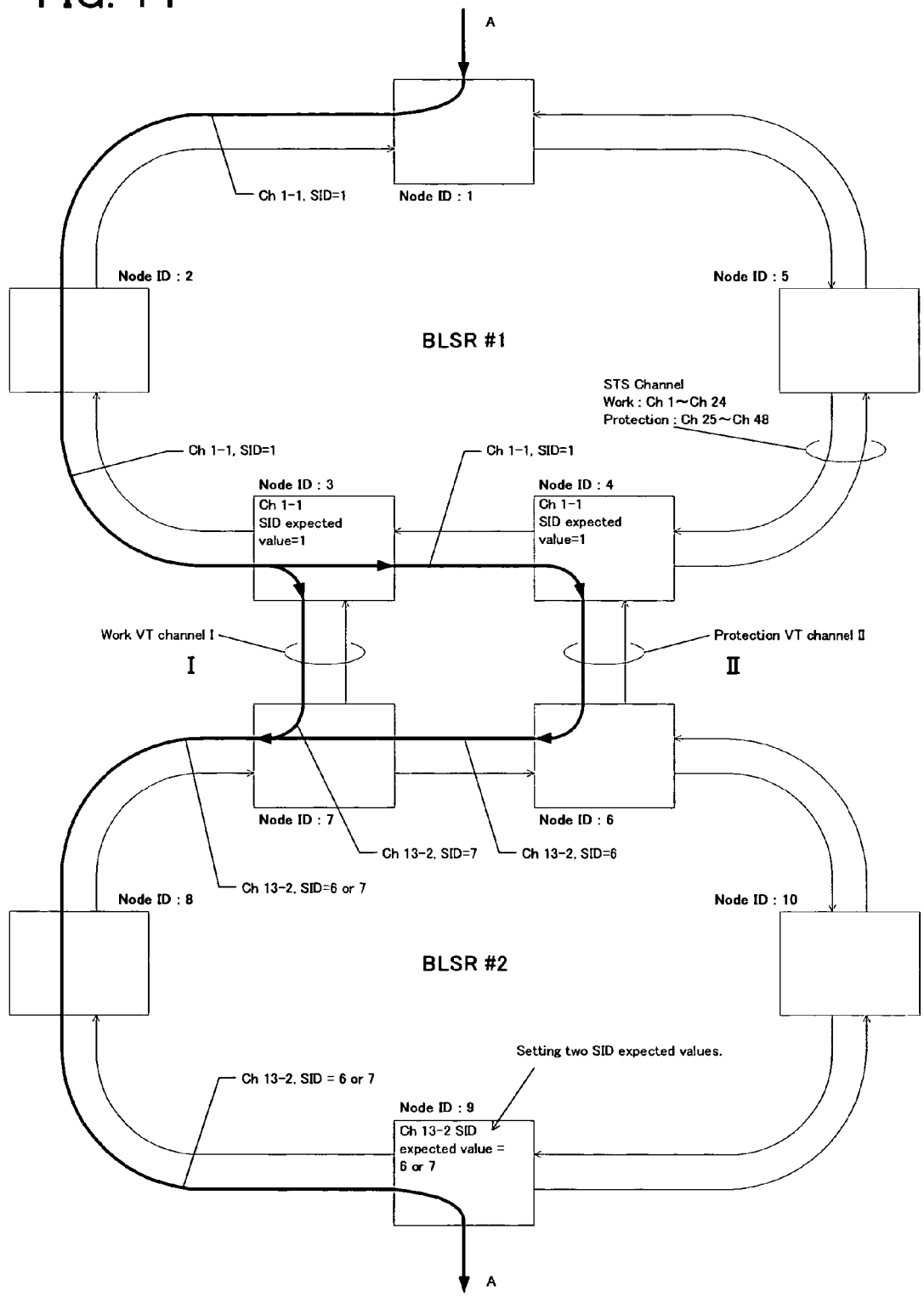
FIG. 14 shows an embodiment illustrating a structure of relieving from a failure having occurred in a VT channel connecting two networks.

Now, in FIG. 14, there is shown an embodiment in the case that two networks, i.e. BLSR #1 including nodes ID1-ID5, and BLSR #2 including nodes ID6-ID10 are provided. The two BLSR networks are interconnected by VT channels, and a structure of relieving from a failure in a VT channel interconnecting the two networks is illustrated.

Additionally, the embodiment shown in FIG. 14 shows a case of VT channels having a redundant configuration consisting of a work channel I, and a protection channel II. In node ID3, both a channel dropped to the work channel I, and a channel passing through (or, continued) to node ID4, are set simultaneously.

The processing operation for the VT channel in each node will be illustrated in the following.

In nodes ID1 and ID6 (i.e. add nodes), a VT channel A is added into a higher-order STS channel. At this time, each node ID of the node concerned (i.e. ID1 or ID6) is set as a source node ID, and inserted in the V3 byte of the channel concerned.

In nodes ID2 and ID8 (pass-through nodes, or may be referred to as continue nodes) the VT channel is continued. At this time, each source node ID received by the V3 byte of the channel concerned is inserted into the V3 byte for transmission, without any modification.

In node ID3, processing is performed against the channel dropping to the work channel I, and the channel passing through to node ID4. For the drop channel, the source node ID of the receiving channel is collated with the expected value, and when the collation does not match, squelch is performed.

In the example shown in FIG. 14, squelch is not performed because the collation matches. In regard to the channel continued to node ID4, the same processing as in the pass-through node is performed.

In node ID4 (drop node), the VT channel is dropped. The received source node ID is collated with the expected value, and squelch is performed when the collation does not match.

In node ID7, either the channel inserted from the work channel I, or the channel continued from node ID6, is selected and switched, depending on conditions of a failure, etc.

Node ID9 performs collation of the source node ID with the expected value, and when necessary, squelch processing. However, in node ID7, it depends on the situation which of the work channel I and the protection channel II be selected. Therefore, it is necessary to prepare and set two IDs, node ID6 and node ID7, as the expected source-node ID values.

When the received source node ID is neither of the two expected values, the channel concerned is squelched.

As having been illustrated, according to the embodiment of the present invention, it becomes possible for a drop node to provide drop and continue simultaneously, by the preparation of two node IDs for source node IDs.

Moreover, the principle of the present invention can be applied when using the H3 byte, in place of the V3 byte. Using such a method, it is also possible to obtain a BLSR network configuration of the higher-order STS channel, without need of a squelch table.

By inserting a source node ID of the STS channel using the H3 byte, in place of the V3 byte, it becomes possible to incorporate squelch processing in a BLSR network constituted of the STS channels, in the same way as in the BLSR network constituted of the VT channels.

The H3 byte is prepared for the stuff/destuff according to the instruction indicated in the H1 and H2 bytes. In a positive stuff operation, a stuff byte is inserted immediately after the H3 byte. On the other hand, in a negative stuff operation, a stuff byte is inserted in the H3 byte.

Therefore, in the case of the positive stuff operation, as well as in no stuff operation, the H3 byte remains empty. According to the Telcordia standard GR-253 Issue 3 (R3-102), it is specified that the stuff is inhibited for the three frames after the stuff action. Therefore, even if the negative stuff operation occurs, it is possible to transport the source node ID information using this three-frame period during which the stuff is inhibited.

Figure 15:
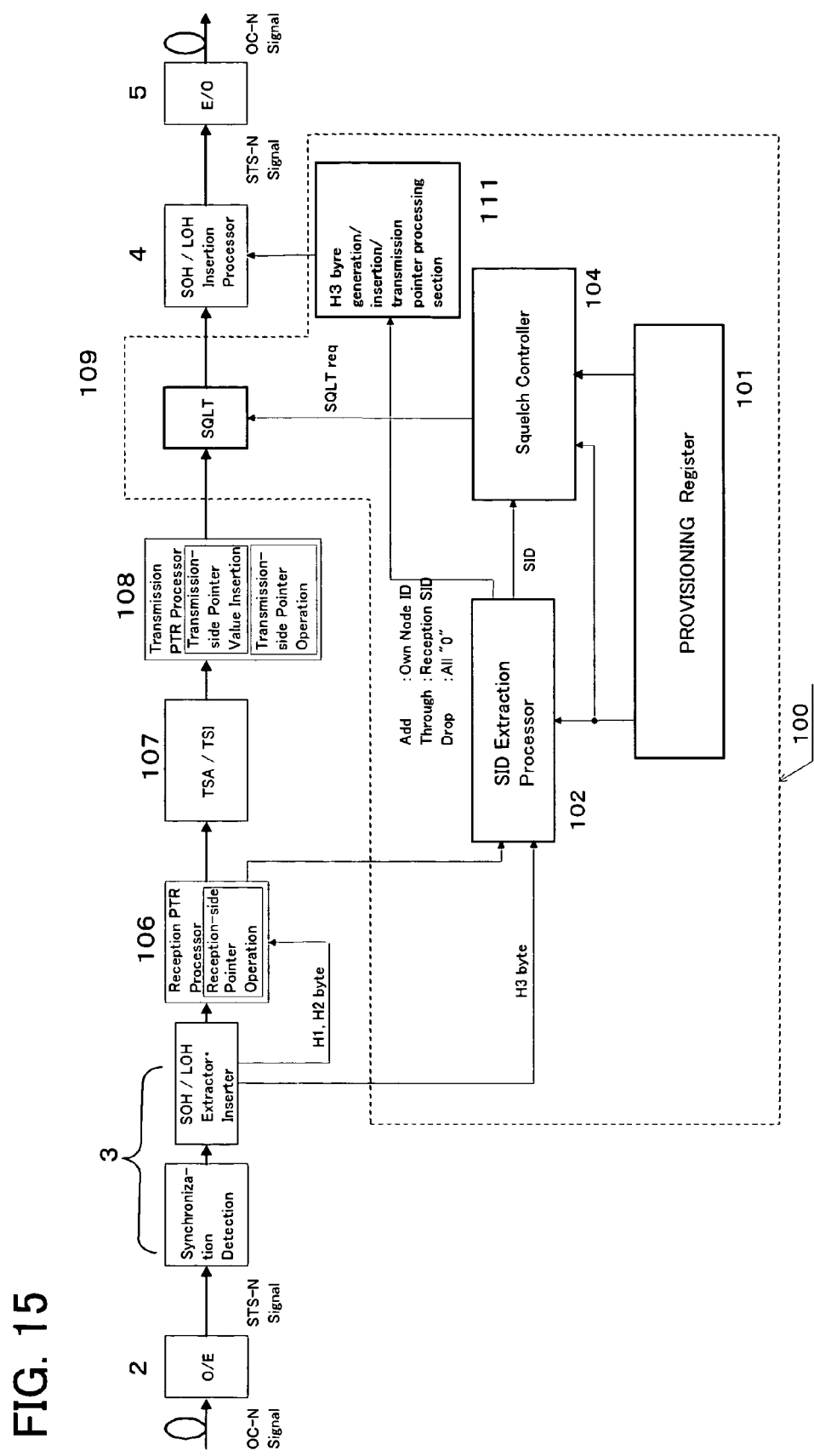
FIG. 15 shows an exemplary configuration when an H3 byte generation/processing/insertion section 111 is added to the existing STS pointer processor 108.

FIG. 15 shows a circuit configuration in which an H3 byre generation/processing/insertion section 111 is newly incorporated into the existing STS pointer processor 108. The operation of this circuit is identical to the operation of the V3 byte processor 100 shown in FIGS. 8 and 9.

The TSI operation for STS channel in a pass-through node, which has been inhibited in the conventional corresponding BLSR network equipment, can be performed by transferring a source node ID and an STS channel ID using the H3 bytes in the three frames.

As having been described the embodiments of the present invention, in a BLSR network configuration, it becomes possible to prevent a misconnection caused by a failure, enabling arbitrary channel setting, without bundling the VT channels to the STS channel. Also, because the method of the present invention can be directly processed by hardware, high-speed operation with improved reliability can be achieved because of a reduced software processing load.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A bidirectional line switched ring network in a synchronous optical network (SONET) comprising:

a plurality of optical transmission equipment sets connected in a ring form via high speed bidirectional channels of a synchronous transport signal (STS) level, wherein lower order channels of a virtual tributary (VT) level are mapped on the high speed bidirectional channels, optical transmission equipment provided in a node on the transmission side performs transmission to each lower-order channel by attaching a transmission-side node ID, and, optical transmission equipment provided in a node on the reception side collates the received transmission-side node ID, which is transmitted using a V3 byte of a virtual tributary (VT) super frame on which each of the lower-order channels of the VT level is mapped, with an expected value of the transmission-side node ID having been set in advance, and when the collation does not match, the optical transmission equipment in the node on the reception side prevents a misconnection in the event of a failure by inserting an alarm indication signal, wherein, using the V3 bytes for three frames, in addition to the transmission-side node ID, a channel ID is additionally transmitted to each lower order channel, so that the time slot interchange (TSI) of the lower-order channel is enabled in a pass-through node.

2. The bidirectional line switched ring network according to claim 1, wherein, using the first to sixth bits of a H4 byte of the virtual tributary(VT)super frame as flag bits to expand a channel ID, the time slot interchange (TSI) is enabled in the pass-through node.

3. The bidirectional line switched ring network according to claim 1, wherein the transmission-side node ID is transmitted using a V4 byte of the virtual tributary (VT)super frame, in place of the V3 byte.

4. A bidirectional line switched ring network in a synchronous optical network (SONET) comprising:

a plurality of optical transmission equipment sets connected in a ring form, wherein optical transmission equipment provided in a node on the transmission side performs transmission to each higher-order channel by attaching a transmission-side node ID, and, optical transmission equipment provided in a node on the reception side collates the received transmission-side node ID, which is transmitted using a H3 byte of a synchronous transport signal (STS), with an expected value of the transmission-side node ID having been set in advance, and when the collation does not match, the optical transmission equipment in the node on the reception side prevents a misconnection in the event of a failure by inserting an alarm indication signal, wherein, using the H3 bytes for three frames, in addition to the transmission-side node ID, a channel ID is additionally transmitted to each STS channel, so that the time slot interchange (TSI) of the STS channel is enabled in a pass-through node.

* * * * *